United States Patent [19]

Hirsch

[11] Patent Number: 4,849,145
[45] Date of Patent: Jul. 18, 1989

[54] PROCESS FOR THE PRODUCTION OF MATERIAL HAVING AT LEAST TWO LAYERS

[76] Inventor: Hermann Hirsch, Hirschstrasse 5, 9021 Klagenfurt, Austria

[21] Appl. No.: 159,958

[22] Filed: Feb. 24, 1988

Related U.S. Application Data

[63] Continuation-in-part of Ser. No. 852,027, Apr. 14, 1986, abandoned.

[30] Foreign Application Priority Data

Apr. 15, 1985 [AT] Austria ............................ 1123/85

[51] Int. Cl.⁴ ..................... B29C 65/22; B29C 39/20; B29C 45/16
[52] U.S. Cl. ..................... 264/46.4; 264/46.5; 264/46.6; 264/135; 264/250; 264/255; 264/259; 264/261; 264/265; 264/328.8
[58] Field of Search ............... 264/46.4, 46.5, 46.6, 264/135, 250, 255, 259, 261, 265, 328.8

[56] References Cited

U.S. PATENT DOCUMENTS

| | | | |
|---|---|---|---|
| 2,874,419 | 2/1959 | May et al. | 264/132 |
| 3,163,686 | 12/1964 | Dusel et al. | 264/46.8 X |
| 4,053,545 | 10/1977 | Fay | 264/46.4 |
| 4,075,266 | 2/1978 | Theysohn | 264/250 X |
| 4,110,139 | 8/1978 | Mashida et al. | 264/46.4 X |
| 4,525,231 | 6/1985 | Wnuk | 264/46.4 X |

FOREIGN PATENT DOCUMENTS

| | | |
|---|---|---|
| 1813915 | 7/1969 | Fed. Rep. of Germany . |
| 2039998 | 3/1972 | Fed. Rep. of Germany . |
| 2856618 | 11/1980 | Fed. Rep. of Germany . |
| 1190818 | 10/1959 | France ............................ 264/27.1 |
| 52-74664 | 6/1977 | Japan . |
| 53-46355 | 4/1978 | Japan . |
| 56-10414 | 2/1981 | Japan . |
| 61-14921 | 1/1986 | Japan . |
| 61-92853 | 5/1986 | Japan . |
| 572390 | 2/1976 | Switzerland . |
| 644057 | 7/1984 | Switzerland . |
| 739801 | 11/1955 | United Kingdom . |
| 977975 | 12/1964 | United Kingdom . |

*Primary Examiner*—Philip Anderson
*Attorney, Agent, or Firm*—Young & Thompson

[57] ABSTRACT

For the production of articles comprising at least one layer of leather or simulated leather material and one layer of a synthetic resin connected to the first-mentioned layer in a shape-mating fashion, a mold cavity is filled with at least one layer of leather or a simulated leather material which later is in contact with at least one of the mold walls, and thereafter a synthetic resin, in the fluid condition or in a condition wherein it is rendered fluid, is introduced into the mold cavity. Finally, the synthetic resin is allowed to penetrate at least partially into the layer of leather or simulated leather material for the purpose of attaining an at least shape-mating bond therewith, and the peripheral edges of the layer of leather or simulated leather material are allowed to be covered by the synthetic resin.

18 Claims, 8 Drawing Sheets

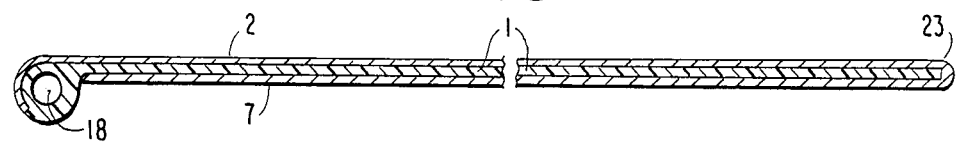
FIG.12
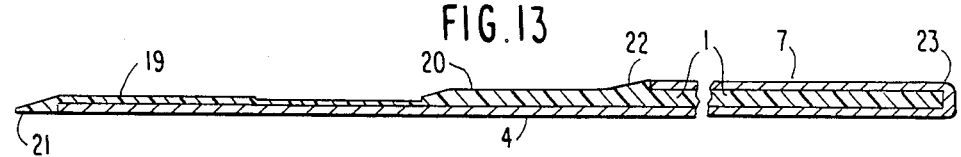
FIG.13
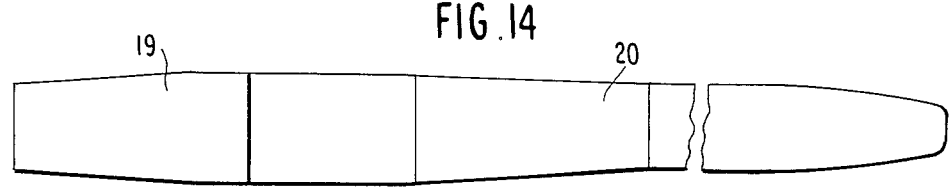
FIG.14
FIG.17
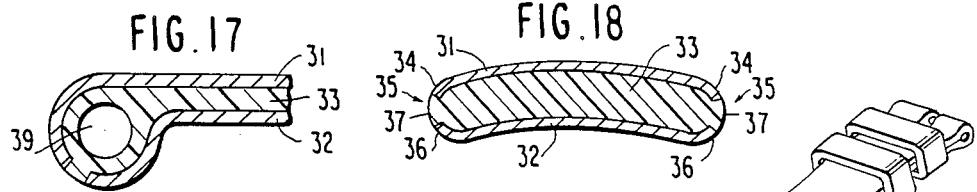
FIG.18
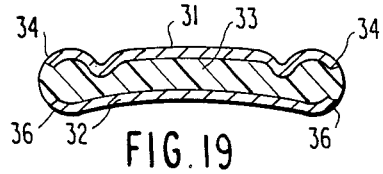
FIG.19
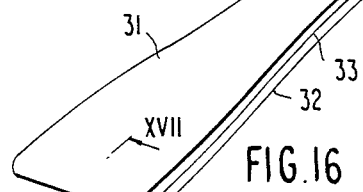
FIG.16
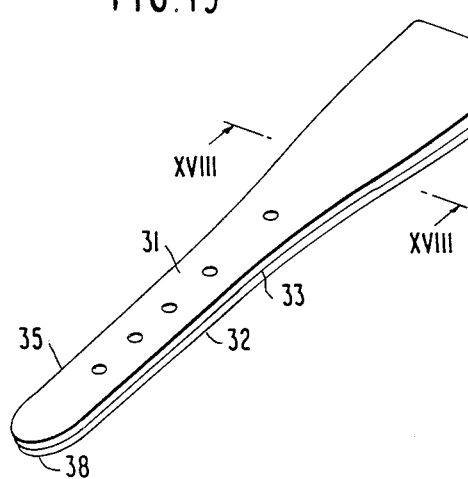
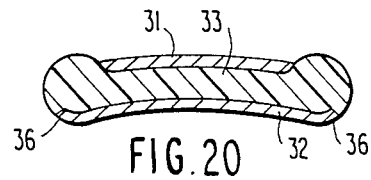
FIG.20

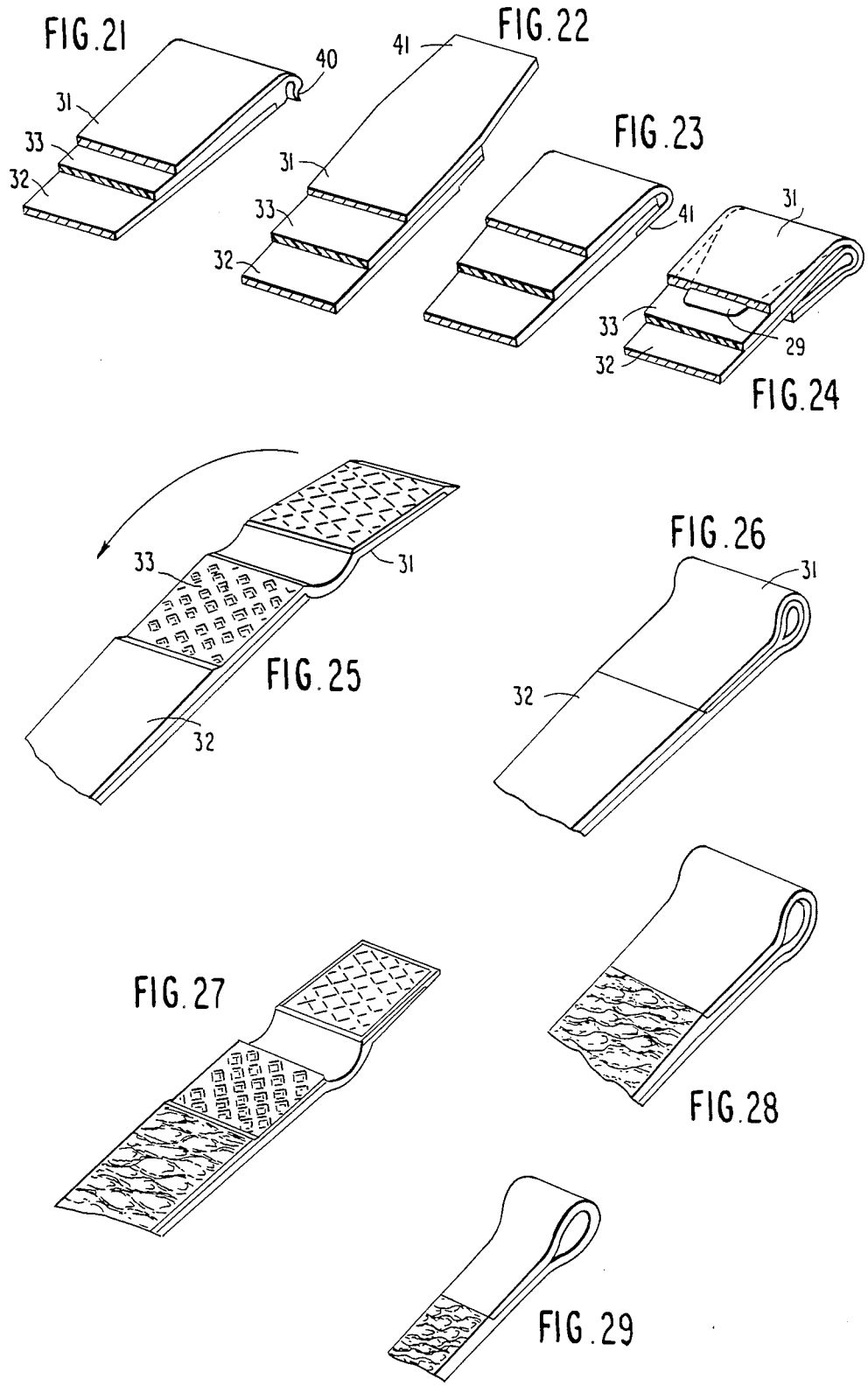

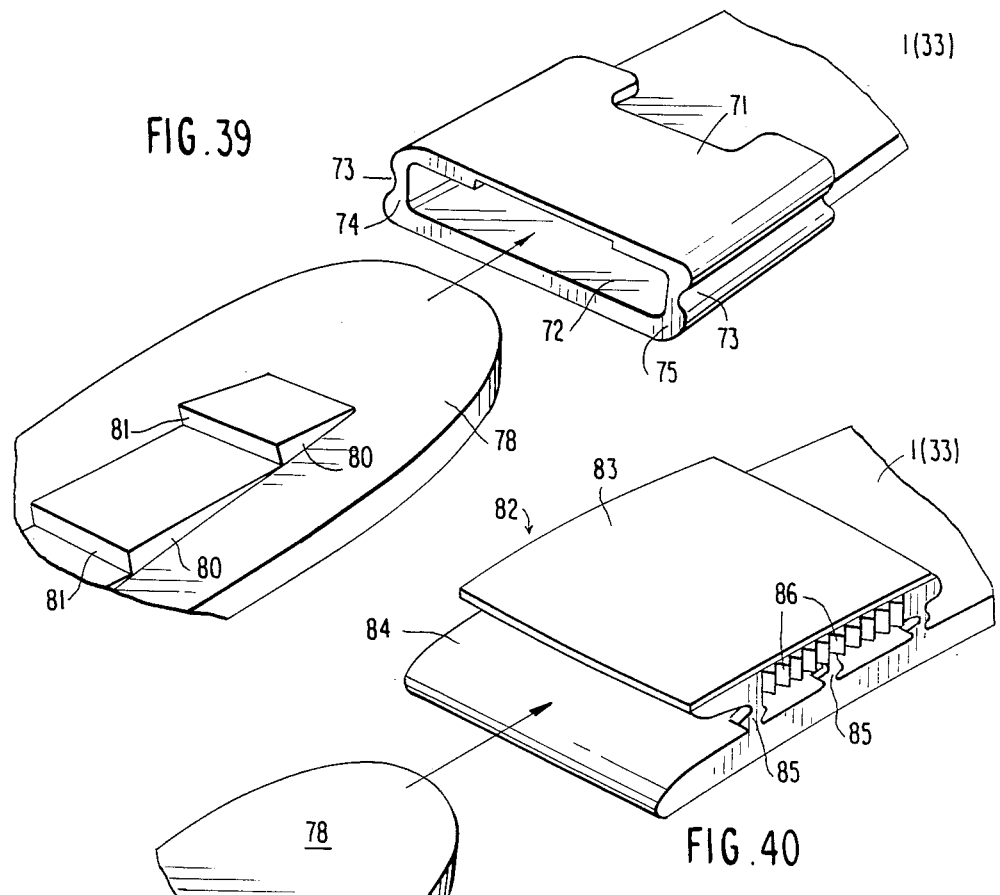
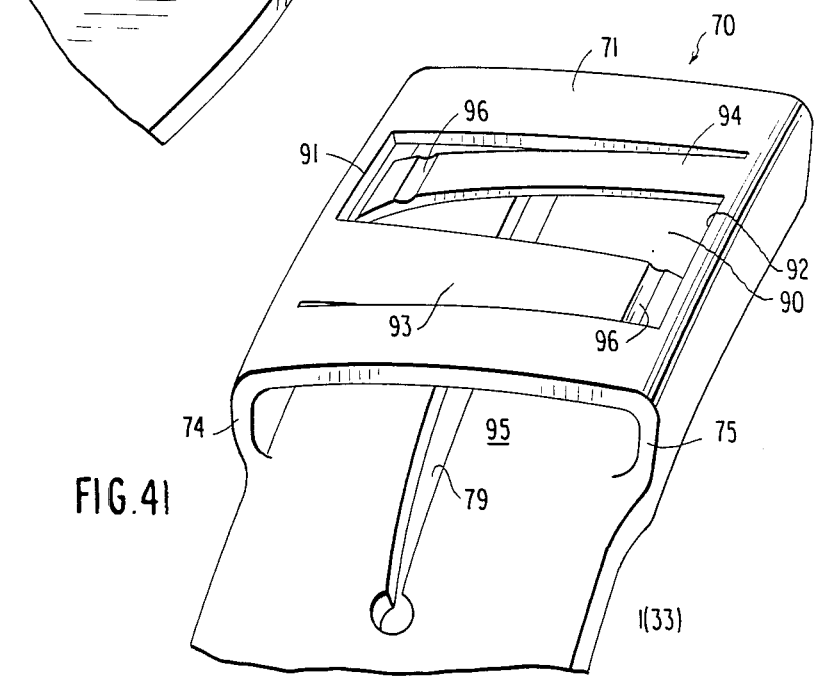

PROCESS FOR THE PRODUCTION OF MATERIAL HAVING AT LEAST TWO LAYERS

This application is a continuation-in-part of copending application Ser. No. 852,027, filed Apr. 14, 1986; now abandoned.

The invention relates to a process for the production of articles comprising at least one layer of leather or a simulated leather material and one layer of a synthetic resin connected to the first-mentioned layer at least in a shape-mating fashion.

The procedure in manufacturing articles consisting of leather or a simulated leather material and of a synthetic resin layer connected thereto has been heretofore to glue the two layers together with the aid of an adhesive. This mode of operation has the drawback that the resultant, composite materials must be processed to the final products in additional working steps which, in certain cases, are rather expensive. In this process, cutting edges are perforce produced in the material of leather or simulated leather; these are disadvantageous on account of the fact that moisture can penetrate into the leather at these locations. Moreover, it was necessary in manufacturing three-dimensional components to prepare complicated cut-to-size blanks which were then made into the three-dimensional article by sewing, gluing, welding, and the like.

The invention is based on the object of indicating a process making it possible to obtain, in a single working step, the article which is finished at least with respect to its shape and contour out of a preferably cut-to-size and prepared layer of leather or a simulated leather material.

In order to attain this object, the invention provides that at least one layer of leather or a simulated leather material is introduced, being in contact with at least one of the mold walls, into a mold cavity, and that a synthetic resin in the fluid condition or in the solid state is introduced into the mold cavity, preferably in the shape of a preform that is converted at least in the region of its surface into a plastic condition, and that the synthetic resin, to achieve an at least shape-mating connection with the layer of leather or simulated leather material, is allowed to penetrate at least partially into this last-mentioned layer and to cover the peripheral edges of the layer of leather or simulated leather material.

With the use of the process of this invention, layers of leather or a simulated leather material, thus also very thin leathers (textured leathers), in great variety as desired, can be made into ready for use articles. A special advantage residing in the process of this invention is that the synthetic resin layer bonded to the leather seals off all cutting edges and the rough side of the layer of leather or a simulated leather material. This not only affords all-around protection of the layer of leather or simulated leather material, but also ensures shape-mating connection between the two layers of the article obtainable according to this invention.

Various possibilities exist for carrying out the process of this invention. Thus, the synthetic resin can be introduced into the mold cavity, previously filled with the correspondingly prepared layer or layers of leather or a simulated leather material, by means of injection molding, injection stamping or, alternatively (especially when processing thermosetting synthetic resins), by casting. An essential aspect in this connection is that the synthetic resin is introduced into the mold cavity in such a fluid condition, or is rendered at least superficially fluid in the mold, so that it can penetrate at least partially into the layer of leather or a simulated leather material, in order to attain the shape-mating bond. This fluidity of the synthetic resin can be obtained in thermoplastics by corresponding heating, temperatures of between 100° and 300° C., preferably about 200° C., being preferred. Analogous considerations apply for thermoplastic elastoplastics.

When using hardening synthetic resins, it is recommended to introduce these in the form of a prepolymer or monomer into the mold and then allow the composition to cure within the mold (by crosslinking).

In any event, a blowing agent can be added to the synthetic resin in order to ensure that the layer of synthetic resin exhibits foam structure in the finished article.

The synthetic resin employed can range from being rigid and/or stiff to rubber-elastic, depending on the destination of the article that can be produced according to this invention.

In order to provide gentle treatment of the layer of leather or simulated leather material, it is advantageous for performing the process of this invention to refrain from heating the mold to excessively high temperatures. On a short-term basis, temperatures of up to 120° C. are possible for genuine leather without permanently damaging the leather. Therefore, it is recommended in executing the process of this invention not to subject the mold to separate temperature control but rather to supply heat to the mold exclusively by way of the synthetic resin introduced at a temperature of between 100° and 300° C., for example about 200° C. In such a case, an equilibrium sets in during the operating cycle between supplied heat and removed heat; in this connection, the mold can have the average temperature of, for example, 40° C.

Ordinarily, a pressure of between 100 and 1,000 bar is utilized in the mold cavity during injection molding when performing the process of this invention.

In the process of the present invention, the layer of leather or a simulated leather material can be placed as a precut blank into the mold half, the outer contour of the latter corresponding to the outer contour of the outside edges of the layer of leather or a simulated leather material in the finished article so that subsequently no edges need to be punched or cut.

Shaping of the initially flat layer of leather or simulated leather material can take place either by bringing the layer in contact with the correspondingly shaped mold wall by suction caused by application of a vacuum, in which case, according to the process of this invention, the intake ports can be arranged preferably in the zone of the outer edges of the layer of leather or simulated leather material. Another possibility for imparting to the layer of leather or simulated leather material its final three-dimensional configuration in the process of this invention resides in pressing the layer against the mold wall by the filling pressure under which the synthetic resin is introduced into the mold. This embodiment is intended, in particular, for those articles, the outside edges of which are constituted by the synthetic resin layer, the layer of leather or simulated leather material terminating at a spacing from these outer edges.

A further possibility resides in effecting the shaping of the layer of leather or simulated leather material in part by suctioning the layer against the mold wall of the mold half and in part by means of the filling pressure of the synthetic resin. In this procedure, efforts will normally be made to provide that the deformation under the effect of the pressure from the synthetic resin will not exceed the extent of extensibility of the layer of leather or simulated leather material so that this layer will not execute within the mold a relative motion with respect to the mold wall, especially in the region of the edges of this layer, during introduction of the synthetic resin.

The final outer contour of the layer of leather or simulated leather material can be fixedly determined prior to insertion in the mold by punching or cutting to size, or by a punching step performed simultaneously with the closing motion of the mold. Combinations are likewise possible.

The process of this invention results in articles, the shape of which is determined by the synthetic resin bonded to the layer of leather or simulated leather material. It is thereby possible to manufacture, from flat leather layers, practically any desired configuration, it also being possible to produce undulations, articles having differing wall thickness, and so forth.

When processing a thermoplastic resin according to the injection stamping method, it is recommended to preheat the mold tools somewhat so that the synthetic resin can be uniformly distributed in the mold during closing of the latter, and will not solidify prematurely.

Finally, it is possible to utilize the reaction injection molding method in the process of this invention wherein a multicomponent synthetic resin is introduced into the mold cavity and crosslinked in situ. This method can be used, for example, for polyurethanes.

The increase in volume occurring during the crosslinking of thermosetting resins and/or during the blowing of synthetic resins can also be employed for placing the layer of leather or simulated leather material into close contact with the mold wall associated therewith.

Synthetic resins which can be processed according to the method of this invention and/or which can be utilized in this method are all thermoplastics, elastoplastics, thermoplastic elastomer or thermosetting resins, such as, for example, polyurethane, ionomers, silicone rubber, polyolefins, such as polyethylene and polypropylene, as well as polystyrenes, and many others in addition to the above.

The synthetic resin, bonded according to the process of this invention with the layer of leather or a simulated leather material, can also be utilized for connecting to the layer of leather or simulated leather material additional articles. Such articles can be, in case of straps, closures, buckles, or the like or, in case of suitcases or bags, fittings or fitting parts.

It is furthermore possible to mold the synthetic resin, bonded to the layer of leather or simulated leather material, into three-dimensional structures during execution of the process of this invention. Such structures can be, for example, eyelets for connecting watchbands to the stems of watch housings. It is moreover possible to mold the synthetic resin, bonded to the layer of leather or simulated leather material according to the process of this invention, directly to closures or closure counterparts provided at the ends of the straps (watchband sections). In this version of the process according to the invention, it is recommended to utilize the bicomponent injection molding procedure since frequently different strength and elasticity properties are required for the synthetic resin connected to the layer of leather or simulated leather material than for the synthetic resin constituting the closure or the like. In the bicomponent injection molding method, varying synthetic resins which optionally are also dyed differently, or identical synthetic resins with differing colorations are processed in sequence.

In the manufacture of watchbands, it is also possible to connect, by way of the synthetic resin applied to the leather, decorative members or spring bars to the watchband usable for joining the watchbands to watch casings.

It is moreover possible according to the process of this invention to produce sliding loops or the like by introducing a layer of leather or simulated leather material formed into a ring into a corresponding, annular mold cavity.

As an embodiment, the production of the watchband, shown in FIG. 1 of the appended drawings in a cross-sectional view, by means of the injection molding method will be described below:

An appropriately cut-to-size leather strip 2 is inserted into one mold half of an injection mold in such a way that the outer surface 4 of the strip contacts the mold wall and is retained by suction against the mold half by means of vacuum apertures (for example a slot extending all around) in the region of the longitudinal lateral edges 5 of the strip. Placing of the layer 2 into the mold cavity can take place manually or with the aid of a transfer device which in a specific fashion removes the cut-to-size leather strip from a template with planar support surface or from a storage magazine and places the strip into the mold half. This procedure has the advantage that the layer 2 is inserted in the mold half in an exactly defined manner and thus the subsequent adjustment by moving the layer can be omitted, this adjustment being difficult or downright impossible due to the applied vacuum. Then the mold is closed.

The synthetic resin constituting layer 1, in the present case a thermoplastic elastomer (polyurethane), is melted in the injection unit and transported into the screw antechamber wherein, after presence of an adequate amount of synthetic resin, the screw, for executing the injection step, is axially advanced and the mold cavity is filled up with the synthetic resin melt. The temperature of the synthetic resin in the screw antechamber (mass temperature) is about 250° C.; the temperature of the mold is on the average 40° C., and the injection pressure, i.e. the pressure with which the screw is axially stressed during the injection step, is 100 bar.

After a cooling phase of 10 seconds, the mold is opened and the watchband or watchband section can be removed; of course, an automatic ejector can also be set in operation.

As mentioned above, the layer of leather or of a simulated leather material can be placed, cut-to-size, manually or with the aid of a transfer means withdrawing the layer, for example, from a template, a magazine, or a punching or cutting device, into the opened mold. In the mold, the layer can be retained, for example, by gravity and/or by applying a vacuum. The mold half receiving the layer of leather or simulated leather material can be displaceable with respect to the other mold half transversely to the closing direction (sliding table, round table, or the like) in order to simplify the insertion step.

A great variety of different articles can be produced according to the process of this invention. Examples are: small leather goods, watchbands, ballpoint pen housings, jewelry boxes, leather suitcases, ring binders, desk pads, leather buttons, belts, leather steering wheels, leather helmets, balls, cases for games, lighters, etc.

The appended drawings show, partially in schematic views embodiments of articles producible according to this invention, and connecting parts and, respectively, closures which can be manufactured with the synthetic resin layer connected according to the process of this invention with the layer of leather or a simulated leather material in one piece and optionally by the bicomponent injection molding process.

FIGS. 1 through 29 depict various embodiments of watchbands;

FIGS. 33 through 43 show closures and closure counterparts integrally formed with the synthetic resin layer;

Figure 1:
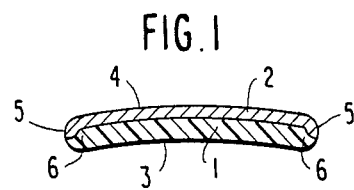

A strap illustrated in FIG. 1 consists of a layer 1 of a synthetic resin, for example polyurethane, polyethylene, ethylene vinylacetate, a thermoplastic elastomer, a polyamide, or similar elastic synthetic resins. This layer 1 is covered on its face side with a strip 2 of leather or a simulated leather material. As can be seen from FIG. 1, the outer surface 3 of layer 1 is flush with the outer surface 4 of the strip 2 in the zones of strip 2 not covered by the latter, so that there are no steps produced between the two materials of which the strap is made.

As can furthermore be seen from FIG. 1, the longitudinal edges 5 of the strip 2 are bent around the longitudinal lateral edges 6 of the layer 1 of synthetic resin, the longitudinal edges 5, however, extending at a spacing from the bottom surface of the strap.

Finally, FIG. 1 shows that the longitudinal edges 5 of the strip 2, which latter exhibits an elongated-flat cross section, are fashioned to converge pointedly.

Figure 2:
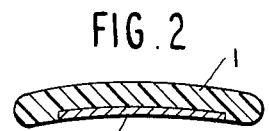

FIG. 2 shows an embodiment of a strap that can be produced according to this invention wherein a strip 7 of leather or a simulated leather material is provided on the bottom face of the layer 1 of synthetic resin. The strip 7 has a width which is smaller than the width of layer 1.

Figure 3:
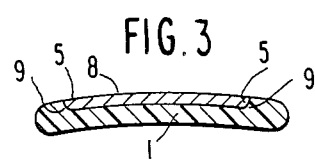

A strip 8 of leather or simulated leather material which is narrower than the width of synthetic resin layer 1 is shown in FIG. 3; this strip 8 is provided on the face side. FIG. 3 clearly shows that the longitudinal lateral surfaces of the strip 8, provided along the longitudinal edges 5 of strip 8, form an acute angle with respect to the width extension of the strip and converge toward the interior of the strap.

Figure 4:
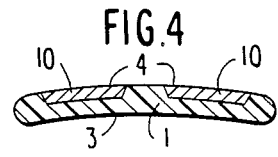

One embodiment having two parallel-extending strips 10 is shown in FIG. 4. Also in this embodiment, the outer surfaces 4 of the strips 10 pass over without interruption into the outer surface 3 of the synthetic resin layer 1.

Figure 5:
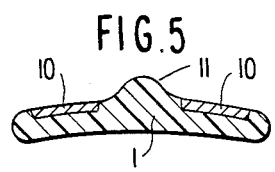

The embodiment shown in FIG. 5 corresponds essentially to that depicted in FIG. 4; raised sites 11 are provided in the region between the strips 10 on the synthetic resin layer 1. The elevations 11 can be made to have the shape of longitudinal ribs, humps, and the like so that three-dimensional design of the face side of the strap is achieved.

Figure 6:
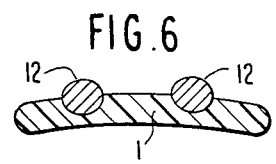

Another three-dimensional structuring of the face side of a strap is illustrated in FIG. 6, longitudinal ribs being formed by strips 12 of leather or simulated leather material possessing an elliptical cross section in the illustrated embodiment, these ribs extending on the face side of the strap.

Figure 7:
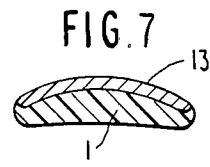
Figure 8:
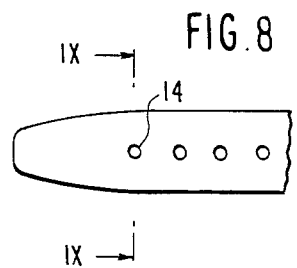

It can be seen from the figures described thus far that the strap can be curved transversely to its longitudinal extension. In this connection, an embodiment can be chosen, as shown in FIG. 7, wherein the visible side of the strap, formed by a strip 13, exhibits a smaller radius of curvature than the bottom surface thereof. Thus, the strap is thicker in its longitudinal center than along its longitudinal edges. This version can readily be attained according to the process of this invention by giving the mold cavity an appropriate configuration.

It is understood that the embodiments for the strips joined to the layer 1 of synthetic resin, and for the cross-sectional shapes of the strap producible according to the invention, as illustrated in FIGS. 1-7, can be combined with one another. In particular, the embodiment shown in FIG. 2 with a strip provided on the bottom surface can be combined with any of the other embodiments illustrated in FIGS. 1 and 3-7.

If holes 14 are provided in the strap of this invention, then there are various possibilities for fashioning same and for producing same according to the process of this invention.

Figure 9:
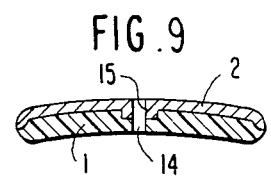

In the embodiment shown in FIG. 9, based on the strap shown in FIG. 1, the strip 2 of leather or simulated leather material is pulled into the hole 14 so that the wall of the hole consists in part of the zones 15 of the strip 2 pulled into the hole. As in all of the other embodiments of the strap producible according to this invention, this embodiment likewise provides a continuous transition between the material of the synthetic resin substrate 1 and the strip 2 and, respectively, its region 15 pulled into the hole 14.

Figure 11:
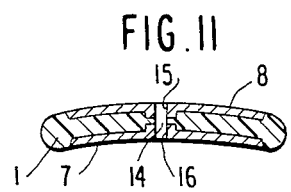

FIG. 11 shows a version wherein the strip 8 provided on the face side as well as the strip 7 provided on the bottom side of the strap extend from below and, respectively, from above into the hole 14. The regions 15 and 16, respectively, of strips 7 and 8 extending into the hole 14 terminate at a mutual spacing; the section of the synthetic resin substrate 1 arranged between the ends of regions 15 and 16 is flush with the outer surfaces of the regions 15 and 16 of strips 7 and 8 extending into the hole 14.

Figure 10:
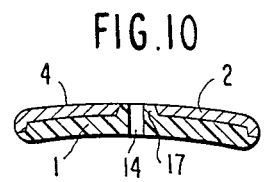

Another possibility of fashioning a hole in the strap producible according to this invention is illustrated in FIG. 10. In the latter, a hole 17 is provided in the strip 2 joined to the synthetic resin layer 1, the diameter of this hole being larger than the diameter of the hole 14 in layer 1. The material of layer 1 extends in the zone of hole 17 up to the outer surface 4 of the strip 2 and terminates at that location flush with this outer surface.

It is understood that also combinations of the embodiments illustrated in FIGS. 9 and 10 are possible, for example realizing the version shown in FIG. 10 on the bottom surface of the strap and realizing the version shown in FIG. 9 on the face side of the strap.

In order to connect the straps of this invention with pins, for example pins of watch casings or buckles, the embodiment can be selected, for example, as illustrated in FIGS. 12 or 13 or 14.

In the embodiment shown in FIG. 12, an eye 18 is integrally molded to one end of the layer 1 of synthetic resin, the strip 2 extending on the face side of the strap at least in part around the eye 18, whereas the strip 7 provided on the bottom surface of the strap can terminate in front of the eye.

In the version illustrated in FIGS. 13 and 14, a loop is conventionally formed by gluing, provided for attaching the strap to pins. For this purpose, two adhesive surfaces 19 and 20 are provided on the synthetic resin layer 1. The special aspect of the version shown in FIG. 13 resides in that the layer 1 tapers stepwise in the zone of its end to be turned over for loop formation, so that with the loop in its finished glued condition, there is no appreciable thickening of the strap. Due to the fact that the free end 21 of the layer 1 is beveled and a correspondingly inclined surface 22 is arranged at the beginning of the adhesive surface 20, there is, moreover, achieved a most extensively step-free transition between the strip 7 provided on the inner face of the strap and the turned-over zone of the strap.

It is indicated in FIG. 12 as well as in FIG. 13 that the strip 4 provided on the face side of the strap can extend around the free end 23 of layer 1 and terminates at that point at a spacing from the bottom surface, whereas the strip 7 ends shortly before the end 23 of layer 1.

According to a further embodiment, the strip 2 on the topside of layer 1 and the strip 7 on the underside can consist of a single cut-to-size piece which is curved in the region of the eye 18. In this case, an arrangement similar to FIG. 12 is obtained in the eye zone, but the strip 2 passes over integrally into the strip 7.

One advantage of the process of this invention also resides in that it is possible to manufacture, for example, wedge-shaped straps, i.e. straps which become thinner from one end to the other end, with strips of leather or simulated leather material having the same thickness at all locations, simply by molding a correspondingly wedge-shaped layer 1.

Moreover, when using appropriate molds, it is possible according to the process of this invention to produce any desired surface structures even with the use of strips having identical thickness over-all. The troublesome and time-consuming preparation (thinning and scarfing) of leather or simulated leather materials is eliminated in such a case.

Figure 15:
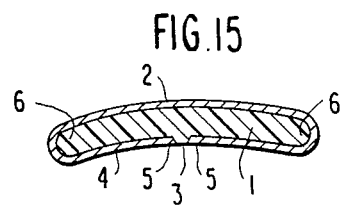

In the embodiment of a strap obtainable according to this invention as illustrated in cross section in FIG. 15, the longitudinal edges 5 of the strip 2 are bent around the longitudinal lateral edges 6 of layer 1 and are located on the underside of the strap and, in the illustrated embodiment, essentially in the longitudinal center of the strap. The longitudinal edges 5 can be adjoining, but they can also be arranged at a mutual spacing. In any event, the outer surface 3 of layer 1 is flush with the outer surface 4 of strip 2.

The strap shown in FIG. 16 fashioned as a bipartite watchband consists in both band sections respectively of top leather 31 and lining leather 32. The top leather and lining leather are connected to each other via a layer 33 of an elastic synthetic resin 3.

As can be seen from FIG. 18, the longitudinally extending edges 34 of the top leather 31 are curved downwardly in the zone of the longitudinal edges 35 of the strap, and the longitudinal edges 36 of the lining leather 32 are curved upwardly. The longitudinal edges 34 and 36 are not in mutual contact, but rather terminate at a distance from each other, the space between the longitudinal edges 34 and 36 being filled out by the layer 33. Thus, the outermost rims 37 of the longitudinal edges 35 of the strap producible according to this invention are constituted by the layer 33.

The material of layer 33 extends from the fiber side (rough side) into the top leather 31 as well as into the lining leather 32 so that top leather 31 and lining leather 32 are impregnated especially in the zone of the longitudinal edges 35 from their inside (fiber side) and are joined in a shape-mating fashion with the layer 33.

In the embodiment of FIG. 18 and the embodiment of FIG. 19 wherein the strap is transversely profiled by longitudinally extending grooves provided in the region of the top leather 31, the rims 34 and 36, respectively, extend over about one-third of the total width of the longitudinal edges 35.

It is also to be noted in connection with FIG. 19 that the profiling of the strap is achieved without having to specially work the top leather 31 and, respectively, without the top leather having to be provided with varying thicknesses.

A similar design as described for the longitudinal edges 35 is also possible in the zone of the pointed or rounded end 38 of the strap and in the zone of the eyes 39. As can be seen, in particular, from FIG. 17, the top leather 31 and the lining leather 32 extend only partially around the eye 39, the vacant space remaining between them being filled out by the synthetic resin of layer 33.

FIG. 20 shows a cross section through a strap wherein the top leather 31 does not extend up to the longitudinal lateral edges 35 but rather terminates earlier. The lining leather 32, in contrast thereto, has rims 36 which are curved upwards into the zone of the longitudinal edges 35.

Besides the eye 39 illustrated in FIG. 16, it is also possible to provide loop structures and hooks, respectively, for attachment of the straps producible according to this invention. Various possibilities therefor are illustrated in FIGS. 21-29.

Figure 30:
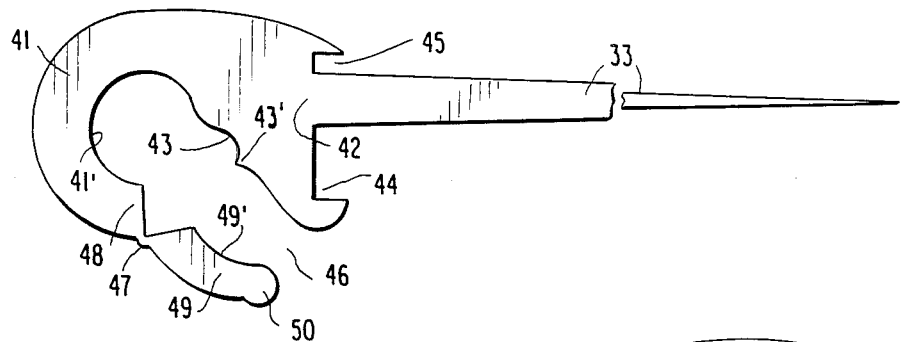
FIGS. 30 and 31 show connecting members fashioned integrally with the synthetic resin layer.
Figure 31:
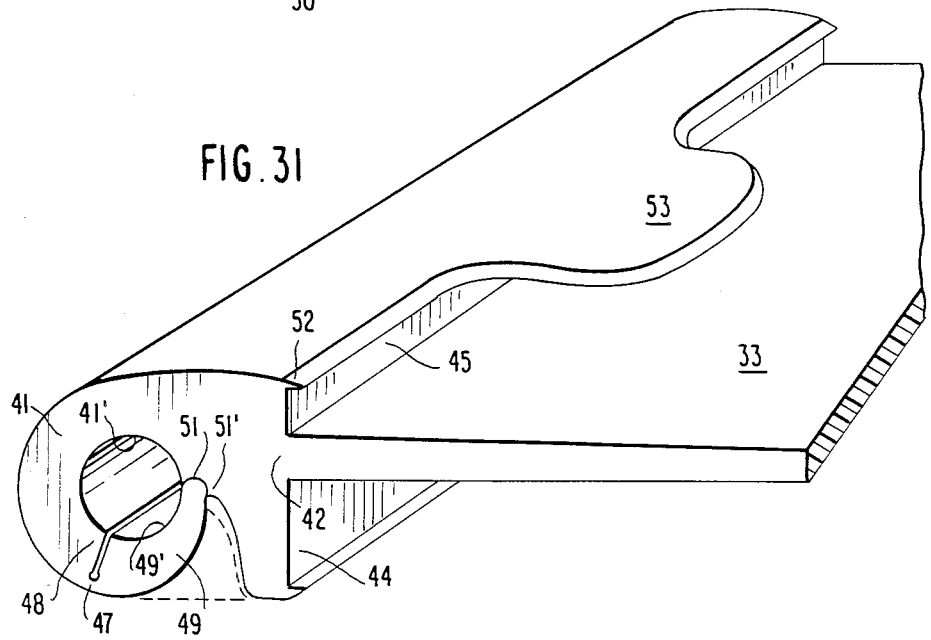

FIG. 21 shows a hook-ended strap wherein the hook 40, covered by the top leather 31, is formed from the layer 33 which joins the top leather 31 and the lining leather 32. As indicated in FIG. 21, the hook 40 can exhibit locking means for closing purposes. More details of such hooks are depicted in FIGS. 30 and 31.

FIGS. 22 and 23 illustrate a glued loop wherein the section 41 of the top leather 31, projecting past the strap end, can be attached by gluing to the underside of the strap, as shown in FIG. 23, thus forming a loop.

FIG. 24 shows likewise a loop-type arrangement wherein the loop is fashioned to be elastic by means of an inserted leaf spring 29 so that the loop need no longer be fixed by gluing. The leaf spring which can, for example, exhibit an essentially U-shaped form, is installed at the same time the strap of this invention is produced, and can have the configuration, for example, which is known from EP-OS No. 0 096 682.

FIGS. 25-29 show in perspective views various practical embodiments for glued loops provided at straps producible according to this invention (watchbands).

A hook shown in FIGS. 30 and 31 consists of the hook 41 proper, a layer 33 of synthetic resin emanating from the base 42 of this hook.

The top leather 31 and the lining leather 32 of the strap shown in FIGS. 30 and 31 can terminate in the recesses 44 and 45, respectively, of the hook base 42. However, it is also possible that the top leather 31, in particular, completely covers the hook 41.

The opening 46 of the hook 41 is closable by a closure member 49 connected to the free end of the hook 41 by way of an integrally formed hinge 47 (cf. FIG. 31). The free end of the closure member 49 carries a bead-like nose 50 that can be snapped into a groove 43 at the hook base 42, the outer rim 43' of which can be fashioned as a barb. It can be seen especially from (FIG. 31 that the hook 41, after the locking member 49 has caught, is entirely closed so that, for example, a pin of a watch is encompassed from all sides.

The closure member 49 can also be profiled as indicated in FIG. 31 in dashed lines so that the closed hook 41 has completely smooth surfaces on both sides.

It is furthermore indicated in FIG. 31 that the rib 52 delimiting the recess 35 at the hook base 42 can have a broadened portion 53 on which initials or other symbols can be provided. Instead of a regional broadening of the rib 52, the latter can also be fashioned to be broader throughout.

The inner surface 49' of the closure member 49 can exhibit the same radius of curvature as the inner surface 41' of the hook 41, the centers (or axes, respectively) of the curvature being congruent when the hook 41 is closed, as illustrated in FIG. 31.

The synthetic resin layer, for example the layer 1 or 33, can also be connected to a hinge closure or, which is readily possible by means of the process of this invention, it can be fashioned directly as a hinge closure.

Figure 32:
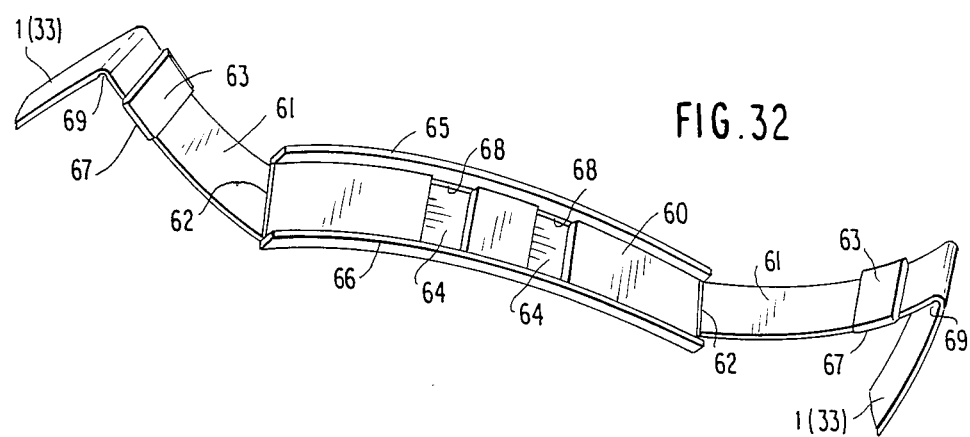
FIG. 32 shows a hinge closure integrally formed with the synthetic resin layer.

Such an embodiment of a hinge closure is illustrated in FIG. 32. In this embodiment, two hinge members 61 are pivotably connected to an elongated part 60 by way of integrally formed hinges 62. Longitudinally extending ribs 65 and 66 are integrally formed along the longitudinal lateral edges of the elongated part 60; between these ribs, the hinge members 61 are received in their position where they are folded down onto the elongated part 60. Preferably, the outer surfaces of the hinge members 61, i.e. their convexly curved surfaces, are flush with the surface of the ribs 65 and 66 extending in parallel to the elongated member 60.

Each hinge member 61 carries, integrally formed therewith, a projection 63. The projections 63 engage into recesses 64 provided in the hinge member 60 with the hinge members 61 being folded down onto the elongated part 60. In this way, the integrally shaped hinges 62 are relieved of tension when the hinged latch is closed.

In order to maintain the pivotable hinge members 61 in their closed position, folded down onto the elongated part 60, the projections 63 formed at the hinge members 61 carry projecting ribs 67 along their lateral surfaces, these ribs having preferably an essentially triangular cross section. These ribs 67 engage, in the closed position, into grooves 68 formed in the zone of the longitudinal sides of the recesses 64 underneath the longitudinally extending ribs 65 and 66.

The layers 1 or 33 emanate from the free ends of the hinge members 61, integrally formed hinges 69 being provided between the hinge members 61 and the layers 1 or 33 of synthetic resin.

On the layers of the articles producible according to this invention, molded parts can be formed integrally therewith. Such molded parts can be, for example, catches in case of straps. Various embodiments are shown in FIGS. 33–43.

A closure member 70 is provided at the free end of a layer 1 or 33, consisting of an elastic synthetic resin, forming one layer of a strap (watchband).

Figure 33:
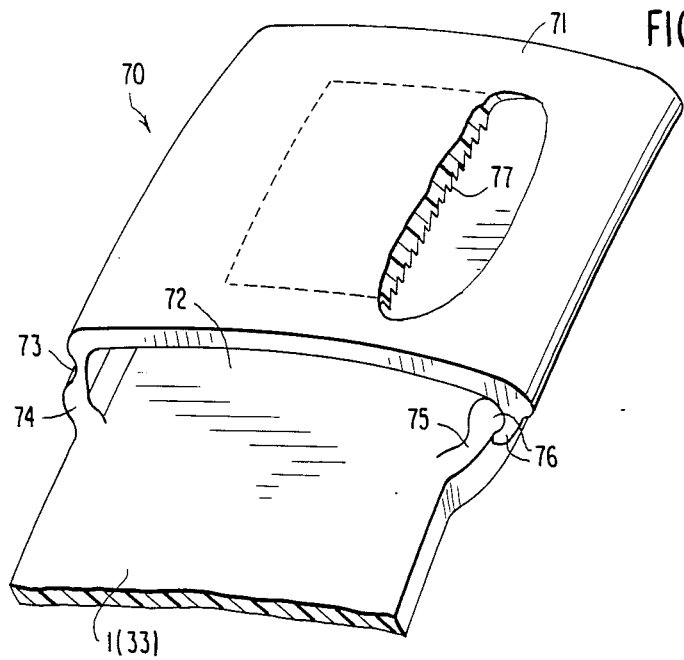
Figure 34:
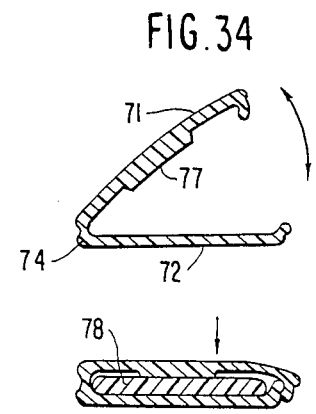
Figure 35:
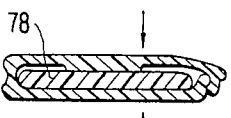

As can be seen from FIG. 33, the closure member 70 is formed integrally with the layer 1.

The closure member 70 has a top wall 71 and a base wall 72. In the illustrated embodiment, the top wall 71 can be folded upwards with respect to the base wall 72 about a film hinge 73 in the region of the sidewall 74 of the closure member 70 (cf. FIG. 34).

The sidewall 75 of the closure member 70 lying in opposition to the sidewall 74 is fashioned as a snap closure and consists of two interlockable longitudinal ribs 75 and 76.

On the underside of the top wall 71, the closure member 70 is equipped with a serration 77. The serration 77 contacts, with the closure member 70 being locked, the topside of the strap 78 to be fastened in the closure member 70. The topside of the strap 78 is provided with profiling, meshing with the serration 77.

Figure 36:
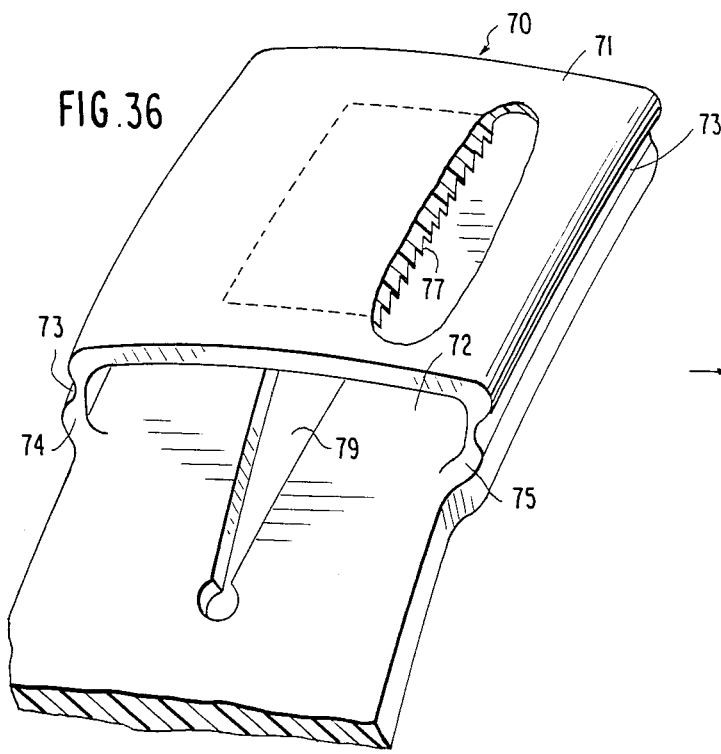
Figure 37:
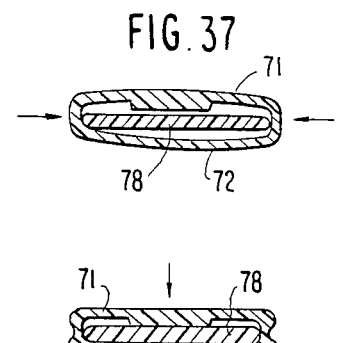
Figure 38:
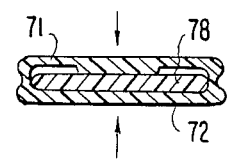

The embodiment of the closure producible according to this invention illustrated in FIG. 36 corresponds to the embodiment shown in FIG. 33, with the exception that the sidewall 75 is not fashioned as a snap connection but rather is fashioned, like the sidewall 74, as a continuous wall extending in one piece. In the embodiment shown in FIG. 36, the end of the strap 78 to be fixed in the latch member 70 is retained, as shown in FIG. 38, by the inherent tension of the closure member 70. In case of pressure exerted on the lateral surfaces 74 and 75 (cf. FIG. 37), the spacing between the top wall 71 and the base wall 72 increases so that the end of the strap 78 can be pulled out of the closure member 70. In order to facilitate this deformation of the closure member 70, a slot 79 is provided in the base wall 72, extending in the longitudinal direction of the strap.

The embodiment of a catch producible according to this invention shown in FIG. 39 again comprises a closure member 70 made up of a base wall 72 and a top wall 71, the two walls being integrally connected with each other by way of sidewalls 74 and 75 exhibiting predetermined bending places 73. The end of the strap 78 to be fastened has on its topside at least one, but preferably several wedge-shaped elevations 80; the surfaces 81 of these elevations which are at the rear in the insertion direction serve as abutment surfaces.

The embodiment of the closure of this invention shown in FIG. 40 comprises a closure member 82 made up of a top wall 83 and a base wall 84 joined together by way of webs 85 which latter are elastically deformable. Upon movement of the wall 83, the spacing between the mutually facing surfaces of walls 83 and 84 is enlarged. In order to facilitate displacement of the top wall 83, the latter is equipped in the zone of its two lateral surfaces with friction-increasing ribs 86 or the like. The walls 83 and/or 84 and optionally the strap 78 can be roughened and/or equipped with shape-mating arrangements to increase the tensile strength of the closure.

In the embodiment shown in FIG. 41, the closure member 70 consists of a top wall 71, a base wall 72, and two sidewalls 74 and 75 integrally joining the walls together. Also in this embodiment, the closure member 70 is fashioned integrally with the layer 1 (33) of elastic synthetic resin.

A recess 90 is provided in the top wall 71 of the closure 70 according to FIG. 41. Clamping strips 93 and 94 emanate from this recess 90 from mutually opposed edges 91 and 92, these strips traversing the opening 95 of the closure member 70 essentially diagonally. As shown in FIG. 41, predetermined bending places 96 are provided in the clamping strips 93 and 94. By exerting pressure on the sidewalls 74 and 75 of the closure member 70, the clamping strips 93 and 94 are bent, with simultaneous reduction in size of the slot 79, and release the strap 78 clamped in the closure member 70.

Also in this embodiment, the strap 78 can be fashioned to have friction-increasing effect on at least its surface facing the clamping strips 93 and 94. Moreover, additionally or as an alternative, the topside of the base wall 72 and/or the bottom side of the strap 78 facing same can be fashioned to increase friction.

Figure 42:
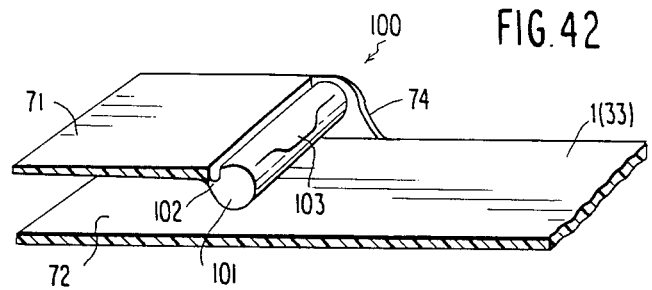
Figure 43:
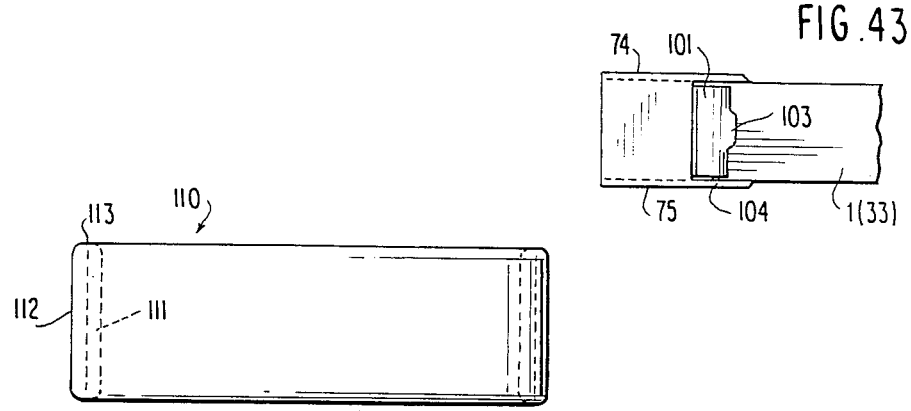

In the embodiment illustrated in FIGS. 42 and 43, the closure member 100 carries at its top wall 71, by way of a film hinge 102, a pivotable eccentric cam 101. For actuation of the eccentric cam 101, the latter is equipped with a projection 103. The arrangement can be such that the eccentric cam 101, in the relaxed condition, has a spacing from the topside of the base wall 71 of the closure member 100 which is smaller than the thickness of the end of the strap 78 to be fastened, so that the eccentric cam 101 contacts the topside of the strap under elastic pretensioning. In case of tension being exerted along the lines of opening the catch 100, the eccentric cam 101 is wedged against the topside of the strap 78 so that the latter is clamped in place.

The contact pressure of the eccentric cam 101 against the end of the strap 78 to be fastened in the closure member 100 can be obtained, additionally or alternatively to an elastic pretensioning in the aforedescribed sense, also by a locking engagement of the eccentric cam 101 against one or both sidewalls 74, 75 of the closure member 100, as indicated in FIG. 43 by detent means 104.

The process of this invention also makes it possible to produce articles of annular shape. This version will be described, using as example a ring serving as a sliding loop.

Figure 44:
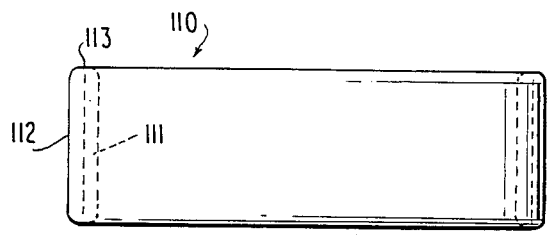
FIGS. 44 through 46 show sliding loops for straps producible according to the process of this invention.
Figure 45:
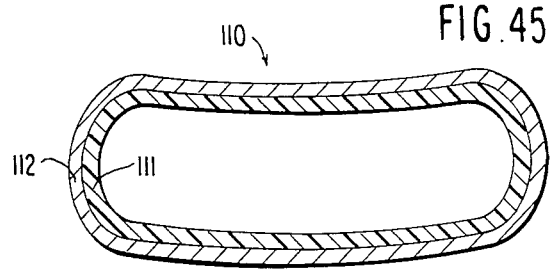

The sliding loop 110, represented in FIG. 44 in elevation and in FIG. 45 in a sectional view, consists of a layer of synthetic resin in the form of an annular support 111 and a layer 112 of leather or of a simulated leather material covering the surfaces of the annular support 111 from the outside.

The layer 112 can terminate in front of the annular end rims 113 of the support 111 or can, alternatively, be extended at least partially around the end rims 113.

Figure 46:
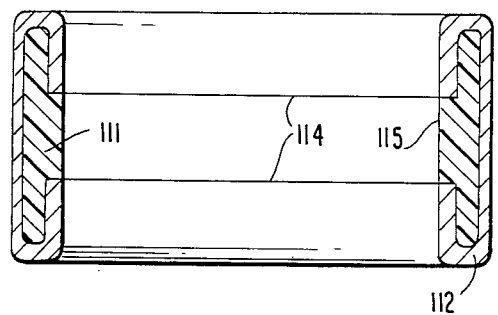

In the embodiment illustrated in FIG. 46, the annular ends 114 of the layer 112 are arranged on the inner surface 115 of the annular support 111 at mutual spacings. It can furthermore be seen from FIG. 46 that the zones of the support 111 not covered by the layer 112 are flush with the surface of layer 112 so that smooth transitions are obtained between the various materials from which the sliding loop 110 producible according to this invention is made up. This also applies, in particular, for the junction zone, extending in the plane of the illustration, between the ends of the layer 112 extending perpendicularly to the annular end rims 114 of the ring-shaped substrate 111.

The sliding loop 110 of this invention can be manufactured by injection molding; the procedure can be, for example, such that blanks of leather or a simulated leather material inserted in a corresponding mold, these blanks then constituting the layer 112, are filled up within the injection mold with the synthetic resin forming the annular support 111. In this process, the material of the support 111 penetrates from the underside (in case of leather, this is the fiber or rough side) into the layer 112, resulting in an intimate shape-mating connection between the two materials.

Materials particularly suitable for the annular support 111 are PU elastomer, PE ionomer, or alternatively LD-PE (=low-density PE).

Figure 47:
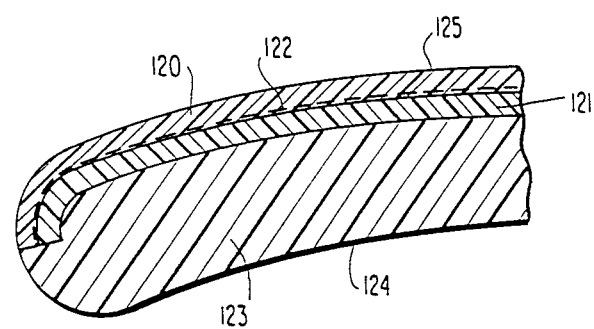
FIG. 47 is a fragmentary cross-sectional view of another embodiment of strap according to the invention.

The embodiment of FIG. 47 is entirely of plastic. To form the article shown in FIG. 47, a layer of flat material 120, which is the layer which ultimately will be the upper side of the watch band, is introduced into a mold cavity and retained on a wall of the mold cavity by the application of a vacuum. A second layer 121, which has previously been adhesively bonded to layer 120, thus forms the side of the introduced material which is remote from the mold wall. Layer 120 is transparent; and layer 121 may be transparent, or transparent and colored, or opaque. In any event, a layer of printing 122 has been formed on layer 121 prior to assembly with layer 120 and the adhesive or cohesive bonding of layers 120 and 121 to each other.

With layers 120 and 121 thus in place in the mold, a layer 123 of synthetic resin in flowable condition is injected into the mold cavity.

The layer introduced into the mold cavity and fixed in place therein, comprised by layers 120 and 121, has a shape at the time of introduction into the mold cavity corresponding to the contour of the watch band component in its finished form.

During injection of the synthetic resin into the mold cavity, a layer is formed at the interface between the injected synthetic resin and the synthetic resin of the previously-introduced layers 120, 121 that firmly bonds the injected layer 123 to the previously-inserted layers.

The synthetic resin introduced into the mold cavity flows around the edges of the previously-introduced layers and covers these edges.

As materials for the various layers, layers 120 and 121 can be for example polyvinyl chloride and the synthetic resin which is introduced into the mold in a flowable condition, which then constitutes the inside face of the watch band, is a thermoplastic resin such as a polyether block amide or a polyester.

In the completed article whose fragmentary cross section is shown greatly enlarged in FIG. 47, the surface that bears against the wrist is designated at 124 and the exposed surface at 125. It will of course be understood that the layer 120, being transparent, permits the layer of printing 122 to be visible to an observer viewing the surface 125.

What is claimed is:

1. A process for the production of articles having at least one surface defined by at least one layer of a flexible material and a layer of a synthetic resin joined to that layer, comprising introducing into a mold cavity a cut-to-size piece of said flexible material in the form of a layer of flat material, drawing said flat material against a side wall of the mold cavity by vacuum, said side wall of the mold cavity having a non-planar configuration, whereby said flexible material acquires said non-planar configuration, the piece of flexible material having edges beyond the surface thereof that is in contact with said non-planar mold cavity wall, said edges and the side of the material opposite said surface being exposed within the mold cavity, and introducing synthetic resin into the mold cavity until the cavity is full, the synthetic resin in the cavity covering and bonding to said opposite side of said material and to said edges beyond said surface, whereby said surface extends flush with the outer surface of the synthetic resin in the region of the edges of said surface of the cut-to-size material.

2. Process according to claim 1, in which the synthetic resin is introduced into the mold cavity by injection molding.

3. Process according to claim 2, in which pressure of 100 to 1,000 bars is employed in the mold cavity.

4. Process according to claim 1, in which the synthetic resin is introduced into the mold cavity by transfer molding or injection stamping.

5. Process according to claim 1, in which a synthetic resin made fluid by heating is introduced into the mold cavity.

6. Process according to claim 1, in which a crosslinkable synthetic resin in the form of a flowable prepolymer or monomer is introduced into the mold cavity.

7. Process according to claim 1, in which a thermoplastic synthetic resin is introduced into the mold cavity.

8. Process according to claim 7, in which the thermoplastic synthetic resin is introduced into the mold cavity at a temperature of between 100° and 300° C.

9. Process according to claim 1, a blowing agent being admixed with said resin in order to expand the latter.

10. Process according to claim 1, the temperature of the mold cavity being maintained constant, not exceeding a temperature of 120° C.

11. Process according to claim 1, and introducing into various zones of the mold cavity various synthetic resins.

12. Process according to claim 1, and molding the synthetic resin in the mold cavity into a three-dimensional item for the formation of connecting parts.

13. Process according to claim 12, in which the synthetic resin is shaped, in the manufacture of straps, at one end of the strap into an eye extending transversely to the longitudinal extent of the strap.

14. Process according to claim 12, in which the synthetic resin is shaped, in the manufacture of straps, at one end of the strap into a closure and, at the other end, into a closure counterpart.

15. Process according to claim 1, in which by the introduction of synthetic resin into the mold cavity, other parts are bonded to the cut-to-size piece of material.

16. Process according to claim 1, and pretreating the cut-to-size piece of material with an agent to change its flexibility.

17. Process according to claim 1, in which the cut-to-size piece of material is pretreated with an adhesion promoter adapted to the synthetic resin utilized.

18. Process according to claim 1, and feeding said cut-to-size pieces of the material into the mold from a magazine containing said pieces.

* * * * *